April 14, 1953     G. O. BROWN ET AL     2,634,539
DEVICE FOR RETRIEVING SPINNERS OR THE LIKE
Filed June 17, 1948
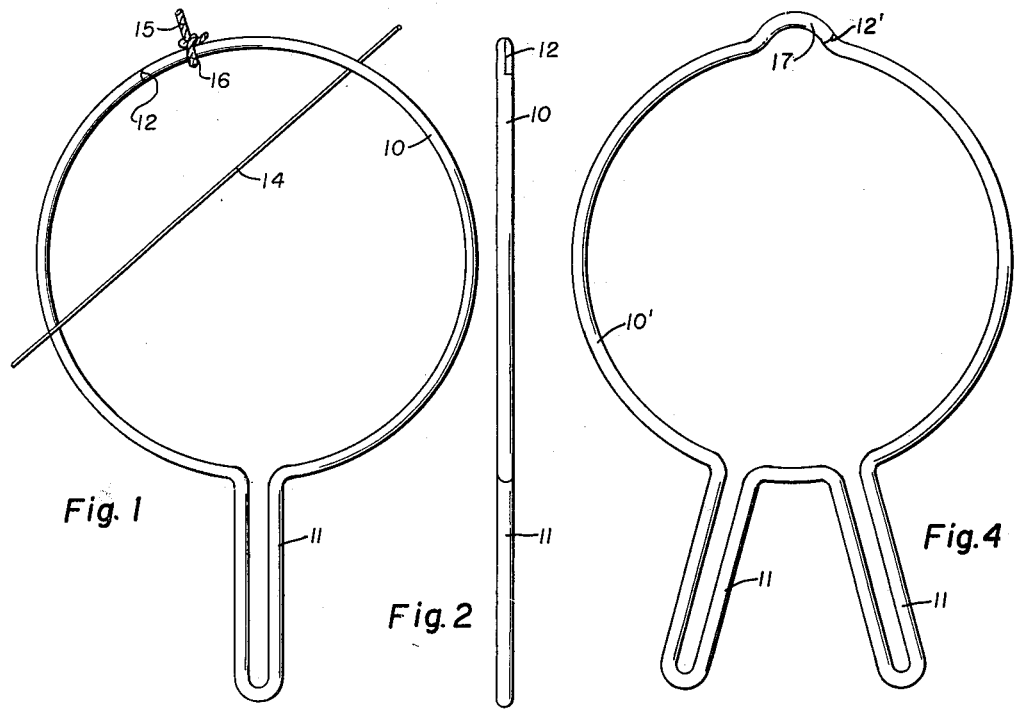
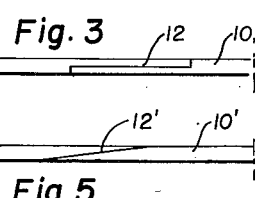
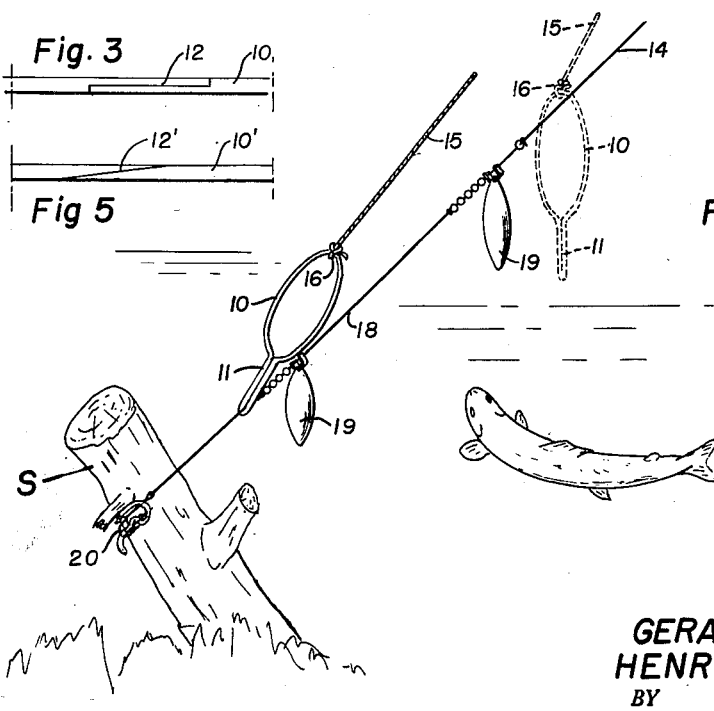
INVENTORS
GERALD O. BROWN
HENRY E. DURCHOLZ
BY
*Lamphere & Van Valkenburgh*
ATTORNEYS Patented Apr. 14, 1953

2,634,539

UNITED STATES PATENT OFFICE 2,634,539

DEVICE FOR RETRIEVING SPINNERS OR THE LIKE

Gerald O. Brown and Henry E. Durcholz, Denver, Colo.; Arlene Durcholz, administratrix of said Henry E. Durcholz, deceased, assignor to said Brown Application June 17, 1948, Serial No. 33,464

4 Claims. (Cl. 43—17.2)

This invention relates to devices for retrieving spinners and the like.

As is well known to followers of the art of piscatorial capture, the possibility of loss of a spinner or other lure provided with a hook is ever present, due to the propensity for hooks to catch or become embedded in stumps or sunken logs, or to catch or become wedged between rocks or other objects lying beneath the water. One or more spoons or other lures may be attached to a steel wire or the like, serving as a leader, and when the hook or a spoon becomes so caught, attempts to dislodge the same often result merely in breaking the line, the latter normally being weaker than the wire or leader.

Among the objects of the present invention are to provide a new improved device for retrieving spinners and the like; to provide such a device which can readily be passed down the line to the spinner or the like; to provide such a device which can be used in dislodging or retrieving a spinner or the like, without causing the fishing line to break, by the imposition of an undue load thereon; to provide such a device which may be made in any one of several forms; and to provide such a device which is relatively simple to construct and inexpensive to manufacture.

The above and additional objects of this invention, together with the novel features thereof, will become apparent from the following description, taken in connection with the accompanying drawing, in which:

Fig. 1 is a front elevation of a device for retrieving spinners and the like, constructed in accordance with this invention, and shown in association with a portion of a line which has been passed therethrough preparatory to its use in retrieving a spinner or the like;

Fig. 2 is a side elevation of the device of Fig. 1;

Fig. 3 is a fragmentary top plan view of the upper portion of the device;

Fig. 4 is a front elevation of an alternative embodiment of the device of this invention;

Fig. 5 is a fragmentary top plan view of the upper portion of the device of Fig. 4; and Fig. 6 is a representation of a spinner caught on a sunken stump and illustrating the use of the device of this invention in dislodging the spinner.

As illustrated in Figs. 1-3, a preferred embodiment of a device constructed in accordance with the invention, for retrieving spinners and the like, comprises a ring or ring-shaped member 10 formed of metal rod or the like, and provided at one side with a U-shaped hook or catch 11, preferably formed integrally with the ring 10. Opposite the U-hook 11, the ring 10 is provided with a lap joint 12 which is adapted to be separated so that a fishing line 14 may be passed therethrough, into the interior of the ring 10. Each U-hook 11 preferably has parallel sides spaced a sufficient distance apart so that a wire or leader will pass readily to the lower end, but a spoon or other equipment on the wire will not pass through the hook. However, the generally U-shaped hook may have tapering or otherwise inclined sides, as long as it will catch on the equipment or the wire or leader, and the space within the hook is in communication with the space within the ring.

A cord 15, which is preferably considerably stronger than the fishing line 14, is attached to the ring 10, as by a loop 16, which is adapted to be slid to one side of the joint 12 to enable the line 14 to be passed into the ring, after which the loop 16 may be slid back over the joint 12. Ring 10, in addition to being relatively heavy, also preferably has sufficient resilience to cause the joint 12 to snap back to closed position after the line 14 has been inserted within the ring.

In the embodiment illustrated in Figs. 4 and 5, the ring 10' is provided with two U-hooks 11, disposed adjacent each other opposite the joint 12' which, as in Fig. 5, may be a long tapered joint. Also, the upper end of ring 10' may be provided with a bend or outwardly extending bulge 17, to position the cord accurately. It will be understood that any desired number of closed hooks 11 may be provided, and that the joint generally opposite thereto may be of other types, in addition to the lap joint 12 of Fig. 3 and the long tapered joint 12' of Fig. 5.

As illustrated in Fig. 6, a wire or leader 18, attached to the lower end of line 14, is provided with a plurality of spoons 19 and a hook 20. In the event that the hook 20 becomes embedded, entangled, or otherwise caught beneath the water, as on a stump S, the fishing line 14 is passed within the ring 10 in the manner previously described. (While the hook is illustrated as being caught on stump S, it will be understood that one of the spoons may be caught.) Due to the weight of the device, it will move by gravity down the line 14, as in the dotted position of Fig. 6, the weight of U-hook 11 holding the U-hook lowermost and preventing the U-hook 11 from striking any of the spoons 19 during further movement down wire 18. Thus, slack on the cord 15 will permit the device to move down the line 14, and then down the wire 18, moving over the spoons 19, until the desired position is reached. It will be understood that it is only necessary for the ring 10 to pass below the uppermost spoon, in order that the spinner wire 18 may be engaged by the closed U-hook 11. Also, it may be found that when the line 14 is in a slanted position, as shown, that the ring 10 tends to stop above the uppermost spinner, when sliding down the line. In such instance, or preferably initially, the boat is backed or moved around until the line 14 is vertical, in which case the ring 10 will readily drop down the line 14 and to the obstruction on which the spinner is caught.

By pulling on the cord 15 at an angle to the line 14, such as at a spaced position from the tip of the fishing pole, the U-hook 11, which is disposed opposite the point of attachment of the cord 15, will move onto the wire 18 and will catch on the next higher spoon or other portion of the equipment mounted on the wire. A sufficiently strong pull on cord 15 will disengage the spinner from the stump S or other obstruction, and the loss of the entire spinner, as well as perhaps a portion of the line 14, is avoided. Of course, when the spinner is pulled loose, the hook which is caught may be broken or otherwise damaged, but the loss of a single hook is much less expensive than the loss of an entire spinner, or the entire spinner and a portion of the line.

As will be evident, a construction which includes more than one U-hook operates in substantially the same manner as the construction which includes one only.

From the foregoing, it is evident that the device of this invention fulfills to a marked degree the requirements and objects hereinbefore set forth. A ring of sufficient diameter to pass freely over the normal equipment on a fishing line and any extension thereof, and having a closed U-hook or the like adapted to engage a portion of the equipment adjacent the lower end of the line, not only passes readily down the line, but also is highly successful in freeing the line. The attachment of a pulling cord or the like to the ring permits a strong pull, which is necessary for successful release of the spinner or the like, in many situations. The attachment of the pulling cord to the ring at a point opposite or substantially opposite the U-hook results in the hook being pulled onto the leader or spinner wire, when the cord is pulled. The hook tends to maintain the ring in the desired position, i. e. underneath the line during downward movement, when the line is slanting. A joint in the ring opposite the U-hook enables the fishing line to be readily passed into the center of the ring, and when the ring is made of resilient material so that the joint tends to close after the fishing line is placed in the center of the ring, there is little chance for the ring to fall off the line during downward travel. In addition, when the cord loop is positioned over the joint, the possibility of the ring falling off the line is substantially completely prevented.

It will be understood that various changes may be made in the device of this invention, since other types of joints in the ring, for passage of the line therethrough, may be utilized, in addition to those shown. Also, more than two U-hooks may be provided, and the shape of the U-hooks may vary, as indicated previously. A wide range of materials may be used, although the preferred materials are steel, bronze, or the like, which are sufficiently heavy to cause the device to pass readily down the line, but also are sufficiently resilient to permit the line introducing joint to be opened for insertion of the fishing line. While the device is conveniently made of rod having a circular cross section, other cross sectional shapes, such as oval, or having one or more flat sides, are permissible. In addition, the ring itself need not be circular, but may be oval, elliptical or otherwise shaped.

Although two embodiments of this invention have been illustrated and described, it will be understood that other embodiments may exist, and that various changes in addition to those enumerated may be made, all without departing from the spirit and scope of this invention.

What is claimed is:

1. A device for retrieving spinners and the like attached to a fishing line, comprising a one-piece, ring-like member having at its lower end at least one integral, generally U-shaped hook, and provided at its upper end with a lap joint slot extending thereacross, the ends of said slot being spaced apart and said member being formed of sufficiently resilient material that said joint may be opened to admit a fishing line to the interior of said member, said hook having substantially parallel sides, the diameter of said ring-like member being sufficient to pass over a spinner or the like while sliding down said line with said hook depending therefrom, and the sides of said hook being spaced apart a distance less than the width of said spinner or the like.

2. A device for retrieving spinners and the like attached to a fishing line, as defined in claim 1, wherein said ring-like member is formed from a rod having a circular cross section.

3. A device for retrieving spinners and the like attached to a fishing line, comprising a generally circular, one-piece, ring-like member having at its lower end at least one integral, generally U-shaped hook, and at its upper end an upwardly extending bulge provided with a joint slot extending across said bulge, the ends of said slot being spaced apart and said member being formed of sufficiently resilient material that said joint may be opened to admit a fishing line to the interior of said member, said hook having substantially parallel sides, the diameter of said ring-like member being sufficient to pass over a spinner or the like while sliding down said line with said hook depending therefrom, and the sides of said hook being spaced apart a distance less than the width of said spinner or the like.

4. A device for retrieving spinners and the like attached to a fishing line, comprising a one-piece, ring-like member having at its lower end a plurality of integral, generally U-shaped hooks, and provided at its upper end with a joint slot extending thereacross, the ends of said slot being spaced apart and said member being formed of sufficiently resilient material that said joint may be opened to admit a fishing line to the interior of said member, each said hook having substantially parallel sides, the diameter of said ring-like member being sufficient to pass over a spinner or the like while sliding down said line with said hooks depending therefrom, and the sides of each said hook being spaced apart a distance less than the width of said spinner or the like.

GERALD O. BROWN.
HENRY E. DURCHOLZ.

References Cited in the file of this patent

UNITED STATES PATENTS

| Number | Name | Date |
|---|---|---|
| D. 46,935 | Wakao | Feb. 9, 1915 |
| 629,213 | Sheets | July 18, 1899 |
| 695,176 | Rumsey | Mar. 11, 1902 |
| 938,765 | Henig | Nov. 2, 1909 |
| 1,044,792 | Levy | Nov. 19, 1912 |
| 1,132,859 | Kohl | Mar. 23, 1915 |
| 1,243,233 | Taggart | Oct. 16, 1917 |
| 1,286,501 | Bauer | Dec. 3, 1918 |
| 1,988,160 | Butte | Jan. 15, 1935 |
| 2,083,814 | Bence | June 15, 1937 |
| 2,210,271 | Thwaite | Aug. 6, 1940 |

FOREIGN PATENTS

| Number | Country | Date |
|---|---|---|
| 6,498 | Norway | Aug. 15, 1898 |
| 168,186 | Great Britain | Sept. 1, 1921 |
| 413,538 | Great Britain | July 19, 1934 |